United States Patent
Abdalla Sabeal Mohamed Al Bloushi

(10) Patent No.: US 11,857,387 B2
(45) Date of Patent: Jan. 2, 2024

(54) DENTAL DAM AND METHOD OF USE

(71) Applicant: Wafa Abdalla Sabeal Mohamed Al Bloushi, Dubai (AE)

(72) Inventor: Wafa Abdalla Sabeal Mohamed Al Bloushi, Dubai (AE)

(*) Notice: Subject to any disclaimer, the term of this patent is extended or adjusted under 35 U.S.C. 154(b) by 336 days.

(21) Appl. No.: 16/767,991

(22) PCT Filed: Jan. 29, 2018

(86) PCT No.: PCT/IB2018/050509
§ 371 (c)(1),
(2) Date: May 28, 2020

(87) PCT Pub. No.: WO2019/145757
PCT Pub. Date: Aug. 1, 2019

(65) Prior Publication Data
US 2021/0186657 A1    Jun. 24, 2021

(51) Int. Cl.
*A61C 5/82* (2017.01)

(52) U.S. Cl.
CPC .......... *A61C 5/82* (2017.02); *A61C 2201/007* (2013.01)

(58) Field of Classification Search
CPC ....... A61C 5/80; A61C 5/82; A61C 2201/007; A61C 17/10; A61C 5/85; A61C 5/90; A61B 2017/00867; A61B 2017/00871; A61B 46/00; A61B 46/20; A61B 46/28; A61B 46/40
See application file for complete search history.

(56) References Cited

U.S. PATENT DOCUMENTS

| | | | |
|---|---|---|---|
| 4,787,849 A | | 11/1988 | Jacoby et al. |
| 6,160,084 A | * | 12/2000 | Langer ............. A61L 27/50 528/196 |
| 10,105,190 B1 | * | 10/2018 | Arant ............... A61B 46/23 |
| 2004/0209224 A1 | * | 10/2004 | Heasley ............ A61C 5/82 433/139 |
| 2004/0219486 A1 | * | 11/2004 | Heasley ............ A61C 3/10 433/136 |
| 2021/0186657 A1 | * | 6/2021 | Abdalla Sabeal Mohamed Al Bloushi ........ A61C 5/82 |

FOREIGN PATENT DOCUMENTS

| | | | | |
|---|---|---|---|---|
| JP | 2004525707 A | * | 8/2004 | ........ A61C 5/82 |
| WO | 00/24334 | | 5/2000 | |

OTHER PUBLICATIONS

International Search Report dated May 9, 2018 relating to PCT/IB2018/050509, 5 pages.
Written Opinion dated May 9, 2018 relating to PCT/IB2018/050509, 5 pages.

* cited by examiner

*Primary Examiner* — Jacqueline T Johanas
*Assistant Examiner* — Shannel Nicole Belk
(74) *Attorney, Agent, or Firm* — Stinson LLP

(57) ABSTRACT

The invention discloses an improved dental dam (10) for use in dental restoration processes. The dam (10) includes a substantially planar membrane (12), having location portions (14) disposed on the membrane (12) and a guide formation (16) which runs along a major surface of the membrane (12). Additionally the dam (10) includes a clamp arrangement (20), which is engageable with and slidably movable along the guide formation (16). Both the membrane (12) and the clamp arrangement (20) are formed of a shape memory polymer.

12 Claims, 8 Drawing Sheets

DENTAL DAM AND METHOD OF USE

CROSS-REFERENCE TO RELATED APPLICATION

This application is a U.S. national stage application of PCT/IB2018/050509, filed Jan. 29, 2018, the contents of which are incorporated by reference in their entirety for all purposes.

FIELD OF THE INVENTION

The invention relates to the field of dentistry. More particularly to an improved dental dam and clamp arrangement, wherein the clamp is engageable with a dental dam membrane and may form part of a dental dam kit. Additionally, the invention teaches a method of use of the new dental dam and clamp arrangement kit.

BACKGROUND OF THE INVENTION

Dental restoration procedures often require the oral structure of interest be isolated from moisture, such as saliva in the mouth and from other fluids such as anesthetising compounds. Additionally, a work area is created in the mouth during the restoration processes, which work area may create filing compounds or other incidental particulates. The dental dam seals off the patient's upper throat from the work area such that the filings or particulates cannot be swallowed or ingested.

To provide the dry, isolated, work area a dental dam is used. The dam includes a membrane which is placed over and around the oral structure of interest. The membrane is commonly formed of a rubber material, such as latex, and includes a plurality of punched holes, each of which closely match the structure. If the membrane does not include these perforations or pre-punched holes, a separate tool (punch) will have to be used to form the appropriate hole. The membrane, which commonly includes a frame to maintain the planer shape of the membrane, is mounted and the hole is pressed over the structure to isolate it. The elasticity of the material retracts the membrane around the structure, to form a snug fit over the structure to prevent the ingress of moisture.

Whilst work is continuing, the dam or membrane has the tendency to pull off from the structure. This possess a problem and various attempts have been made to develop a clamp, which can be secured to a structure and over the membrane, to keep the dam or r membrane in place.

Commonly these clamps are metallic and include two opposing surfaces which are kept in close abutment by a joining body. The clamps are usually biased toward one another to provide the clamping effect. A separate tool is needed to pull apart the two surfaces for placing and removing the clamp. The intense clamping force can cause pain to a patient. More so, clamps of different sizes exist which means that several clamps would have to be tried and fitted to a patient in a single sitting. This placing and removing of clamps, as well as the metallic nature thereof, contribute to the pain experienced by the patient.

In practice a dental dam and clamps becomes expensive. The cost arises not only from the dam and clamps, but also to the associated tools, such as the punch, forceps and the frame, used for mounting the dam correctly.

OBJECT OF THE INVENTION

It is an object of the current invention to address the above mentioned problems, at least to a degree, by providing an improved dental dam and clamp arrangement, in which the clamp is attachable with the dam and wherein the clamp and dam are formed from the same material.

SUMMARY OF THE INVENTION

In accordance with a first aspect of the invention there is provided a dental dam which includes a substantially planer membrane, having; at least one locating portion on the membrane; and a guide formation along a major surface of the membrane; and a clamp arrangement engageable with the guide formation; wherein the membrane and the clamp arrangement are formed of a shape memory polymer.

The invention provides further for the clamp arrangement to be formed of the shape memory polymer manipulated to create an oral structure engaging member; further the clamp may include an undercut section for engaging the clamp with the formation in a slidable manner; further still the clamp may include a handle, for positioning the clamp toward the oral structure; more further still for the clamp to include a pocket region, used for engaging the oral structure; more further still the pocket region may include at least two opposing surfaces, shaped to engage an oral structure; further where the two opposing surfaces may be biased toward each other.

The locating portion on the membrane may be one of the following; an aperture through the membrane or a perforated hole through the membrane or a marking on the membrane.

The invention provides that the formation may be a projection formed in the major surface of the membrane, further the formation may be a tendon which runs along the major surface of the membrane.

The dental dam may include a frame, toward the perimeter of the membrane, and the frame may retain, at best, the substantially planer shape of the membrane.

In accordance with a second aspect of the invention there is provided a dental dam clamp, for use in restorative dental procedures, formed of a shape memory polymer manipulated to create an oral structure engaging member.

The invention provides further that the member may include a handle and a pocket region; further the pocket region may include at least two opposing surfaces; still further the opposing surfaces may be shaped to engage an oral structure; further still the opposing surfaces may be biased toward each other.

In accordance with a third aspect of the invention there is provided a method for using the dental dam according to the invention, the method comprising the following steps;
  placing a flexible membrane to a frame to create the dental dam, as described in the first aspect of the invention above;
  positioning the dam over the mouth of a patient such that the guide formation along a major surface of the dam faces away from the patient;
  further, positioning the dam to align the locating portion of the membrane over an oral structure;
  using the arm of the frame to secure the dam in position;
  depressing an area of the membrane around the locating portion about the structure until the structure projects through the portion;
  allowing the area to retract about the base of the structure to isolate the structure;
  locate the guide formation along the major surface of the membrane;
  engaging to the formation, a clamp arrangement as described in the first or the second aspect of the invention above;

slidably moving the clamp arrangement along the formation to align the pocket region of the clamp over the structure;

pressing the clamp in a direction toward the structure; and receiving the structure in the pocket region.

The invention provides further still for the shape memory polymer to retain a first shape when manipulated into said shape at a first temperature; further for the shape memory polymer to revert to a second shape at a second temperature; further where the first temperature and the second temperature may be different temperatures; further still where the first shape and the second shape are different shapes.

BRIEF DESCRIPTION OF THE DRAWINGS

These and other features of the invention will become more apparent by the following description of the embodiments, which are made by way of example, with reference to the accompanying drawings in which.

BRIEF DESCRIPTION OF THE PREFERRED EMBODIMENTS

Figure 1:
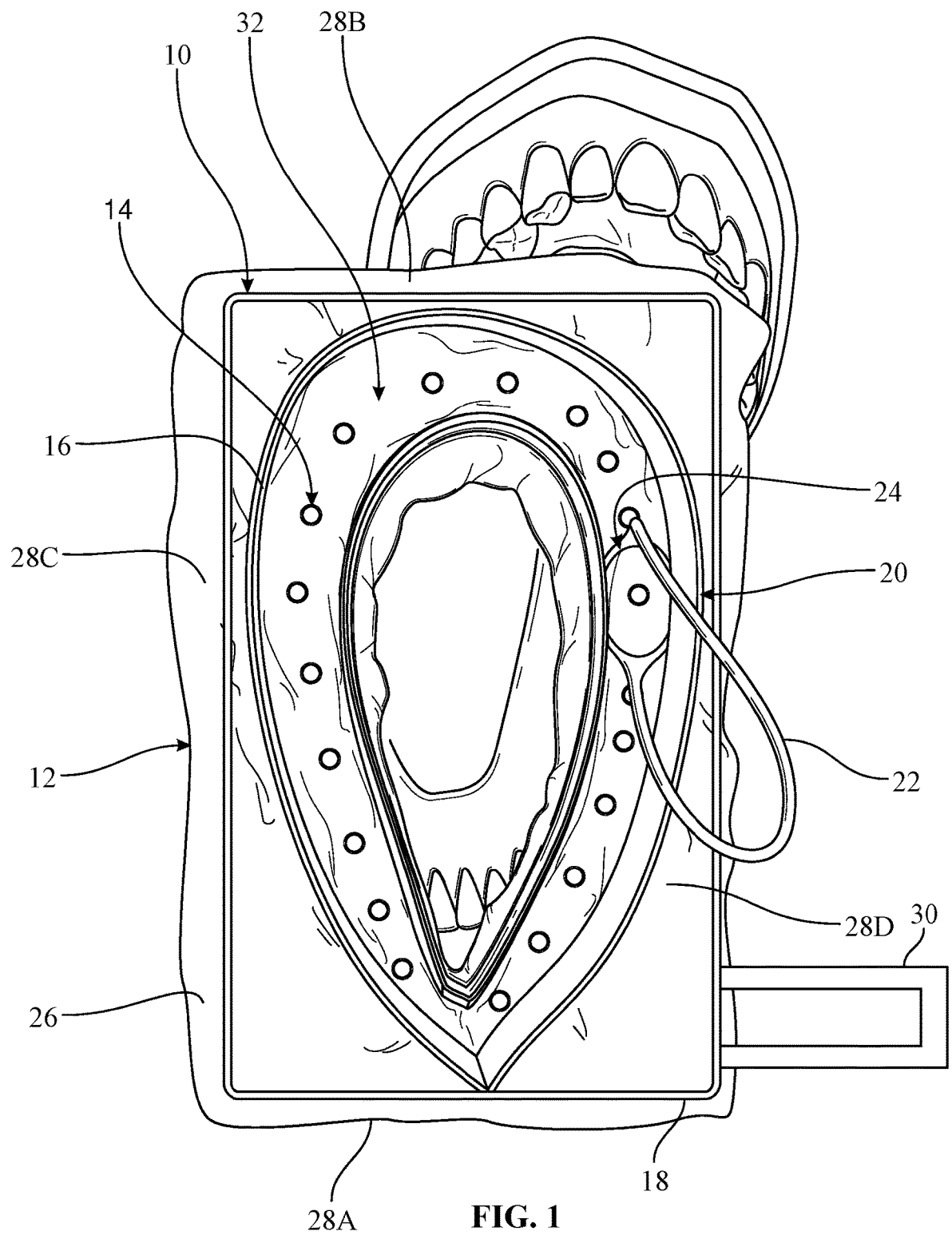
FIG. 1 shows a view, in perspective, of a dental dam in accordance with the invention.

Referring to FIG. 1 which shows a dental dam 10 in accordance with the invention. The dam includes a substantially planer membrane 12 having a plurality of locating portions, collectively numbered 14, a guide formation 16 and a frame 18. A clamp arrangement 20, having a handle 22 and pocket region 24, is shown engaged with the guide formation.

The membrane 12 and the clamp arrangement 20 are both formed of a shape memory polymer. The polymer, specifically a shape memory rubber, is a material which can be manipulated to a new shape, and retain that shape until heated. Once heated the polymer will revert to its initial shape.

The material stretches at a higher temperature, but at lower temperatures will stiffen and harden, thus retaining the new form. Once the new form is no longer necessary the material may be heated to the higher temperature with the result that the material will revert to its initial shape.

Forming the membrane 12 and the clamp 20 of the memory polymer provides advantages over what is the current practice in the art. The membrane may provide for better isolation of an oral structure, particularly in setting the membrane about the structure and for removing the membrane once it is no longer needed. Traditionally clamps used in support of dental dams are a metallic material. These clamps compress intensely on the oral structure. The compression caused by the clamp is painful and uncomfortable to a patient. The clamp 20, formed of the polymer, provides a conservative approach to securing the membrane and oral structure, such that the gingival tissues may remain largely unaffected and the need for local anaesthesia is generally not required.

These and other advantages of the use of the shape memory polymer will be discussed and explained in the description that follows.

Turning back to FIG. 1 where, membrane 12 includes a major surface 26, delimited by edges 28A, 28B, 28C and 28D. Frame 18 encircles the membrane toward the respective edges. The frame is used to hold the membrane substantially flat and moderately taught. The effect is such that the membrane provides a protective cover over the mouth and throat of a patient during a dental or restorative process. The frame includes an arm 30 to help in mounting the frame and for general use.

Locating portions 14 are positioned along the surface 26. Each portion may be in the form of a pre-punched hole through the membrane; alternatively, a perforated hole which may be pressed about an oral structure; alternatively, the portion may be a marking along the major surface of the membrane. The marking may be any visual indicator to set out the position of the portion, which would be visible to a user.

The portions 14 are set out along the surface 26 in an elliptical fashion. The portions are representative of the position of oral structures of a patient, where each portion matches, as closely as possible, the location of an oral structure. The portions will aid the user in correctly aligning the membrane over the mouth of a patient.

Additionally, the elliptical shape of the portions 14 is centrally located on the membrane 12. A user will thus be assured that the membrane is positioned correctly over the patients mouth, to cover the entire mouth region when a portion 14 is over the respective oral structure it represents.

In use, the area of the membrane 12 around a particular portion 14 will be pressed downwardly over the structure to be worked on. The structure thus protrudes through the portion 14. The area about the structure serves as the isolating layer between the oral structure. Saliva, and other unwanted fluids are kept away from the structure by the membrane.

The guide formation 16 is positioned along surface 26. The formation may be in the form of a protrusion formed on the surface, as a projection of the material of the membrane 12. Alternatively, the formation may be a tendon which is secured to the surface. The tendon would preferably be formed of a metallic wire or other similarly rigid material.

The formation 16 provides a track which runs along the surface 26. The clamp arrangement 20 is designed such that it will slide along the formation. This is discussed in more detail below.

The elliptical shape of the portions 14 will be matched, to a degree, by the formation 16.) The formation may run alongside the portions on either an inner or outer circumference of the portion's ellipses. In the current embodiment, there exist a pair of formations 16, which flank the portions, so as to place the elliptic shape of the portions in a channel 32.

Figure 2:
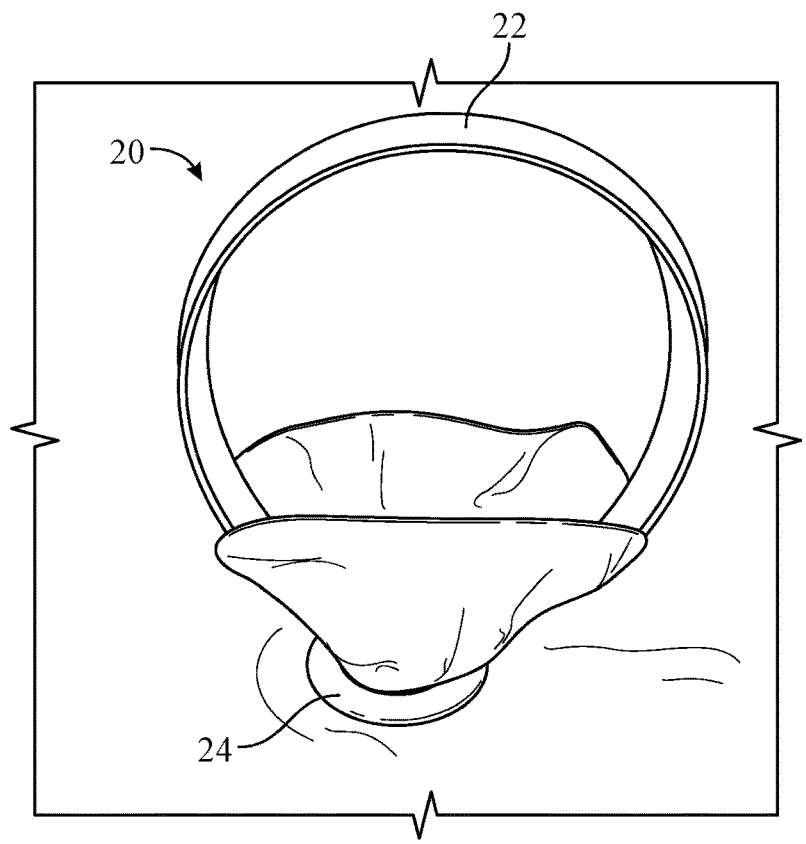
FIG. 2 shows a view, in perspective, of the clamp arrangement in accordance with the invention.
Figure 3:
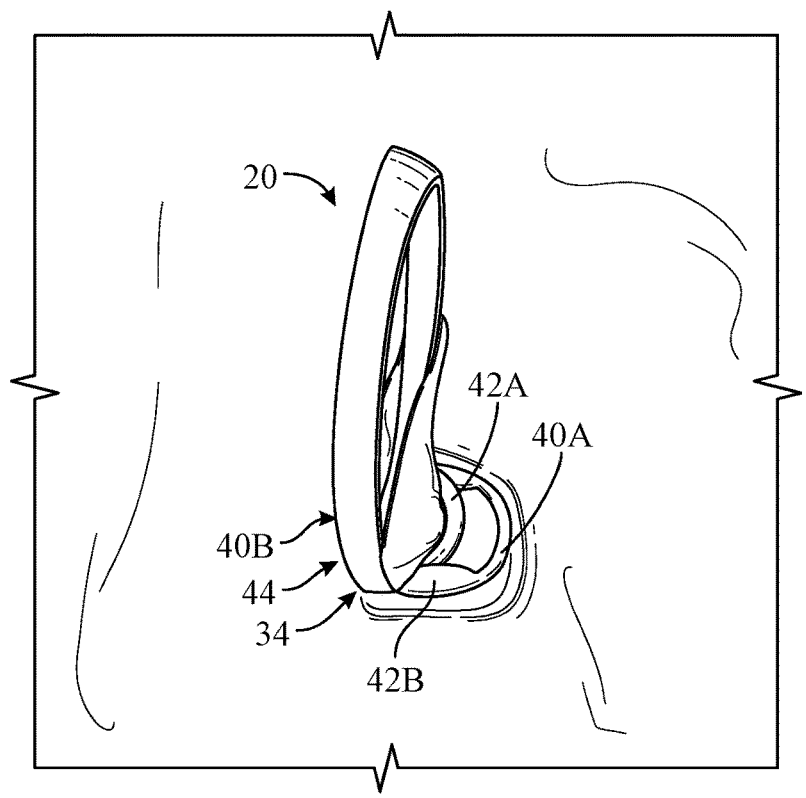
FIG. 3 shows an additional view, in perspective, of the clamp arrangement of FIG. 2.
Figure 4A:
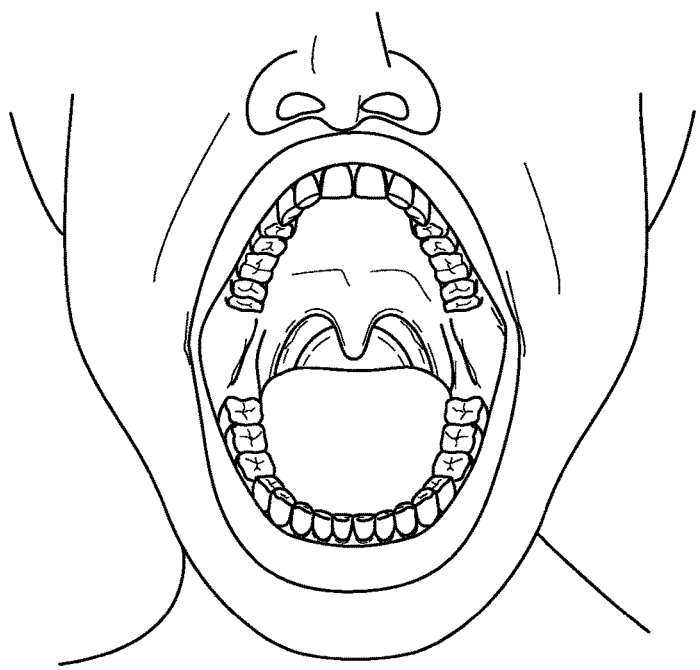
FIG. 4 shows the steps to be followed in the method of using the invention.
Figure 4A:
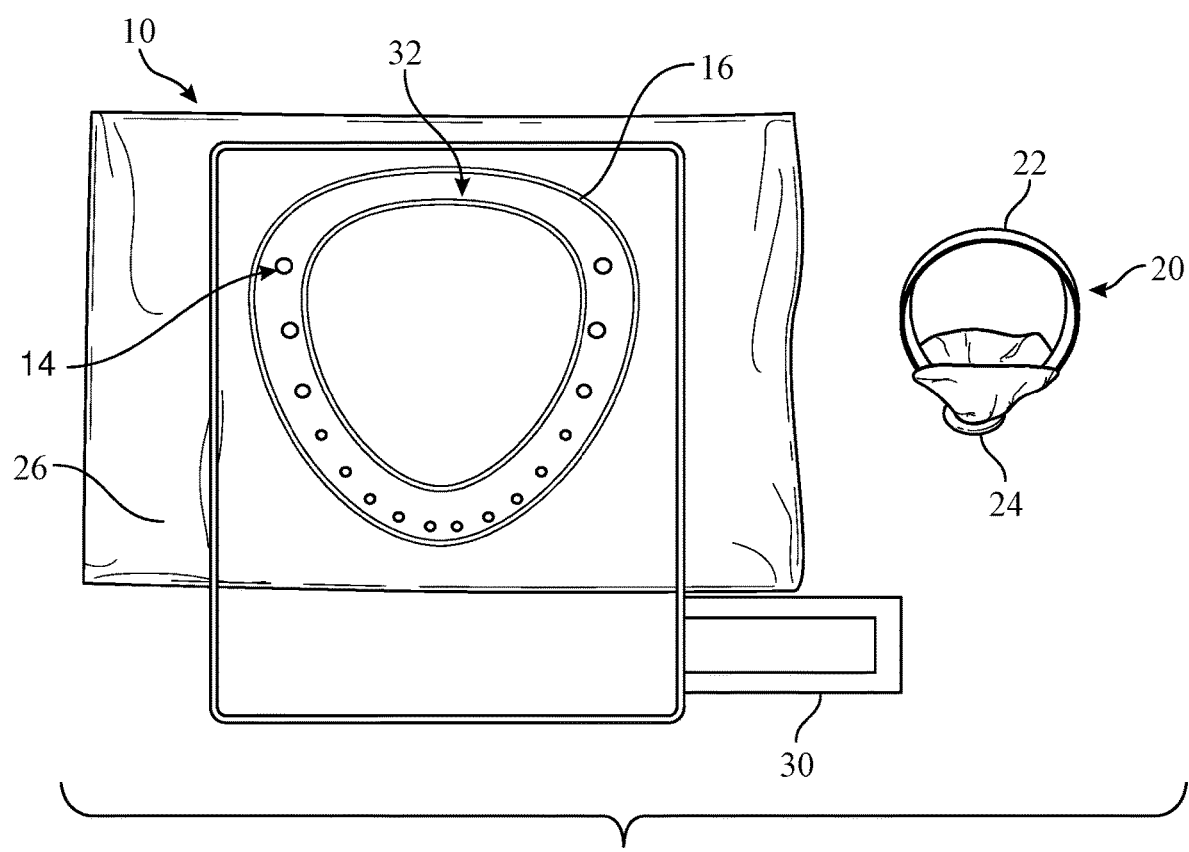
Figure 4B:
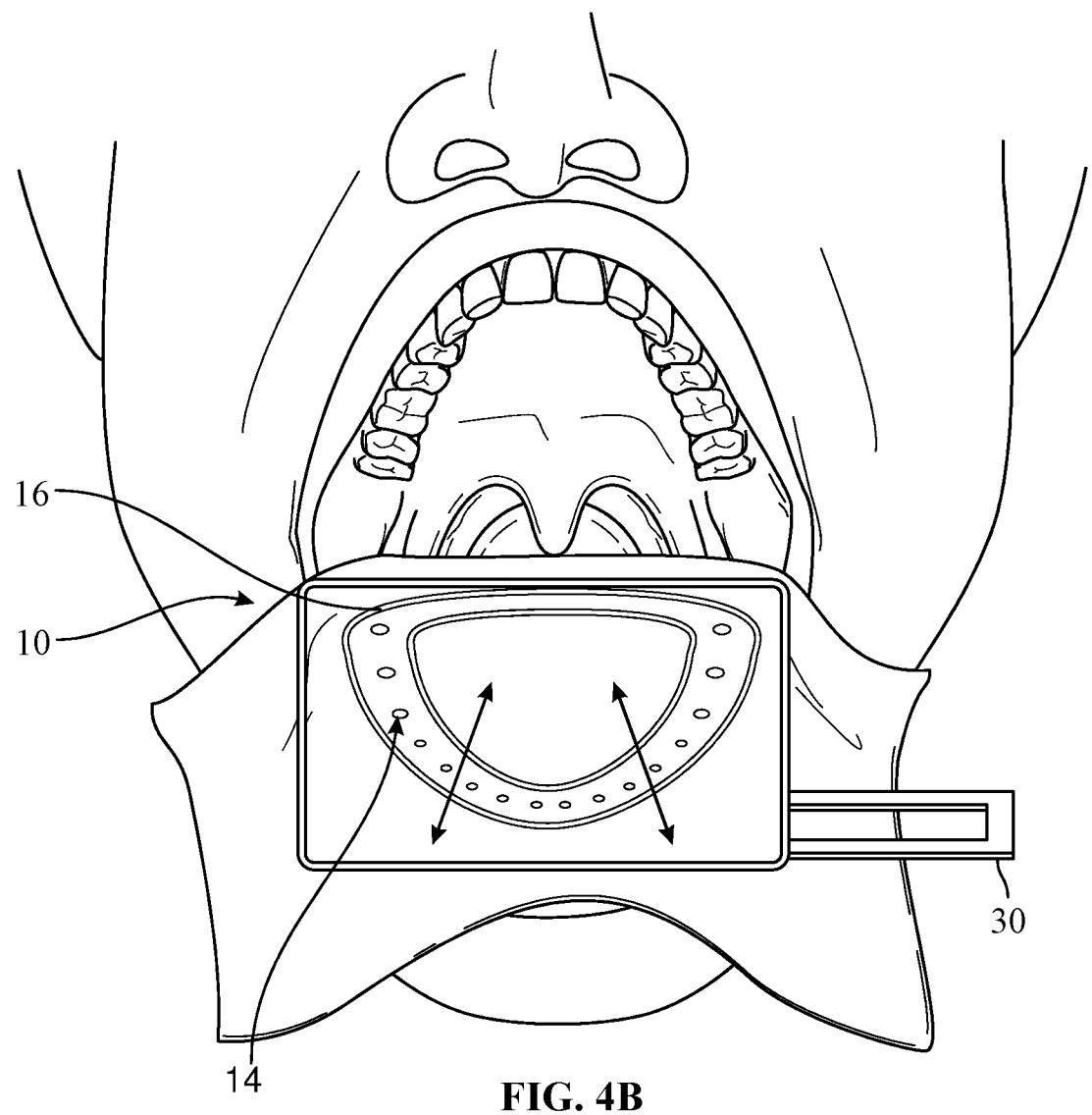
Figure 4C:
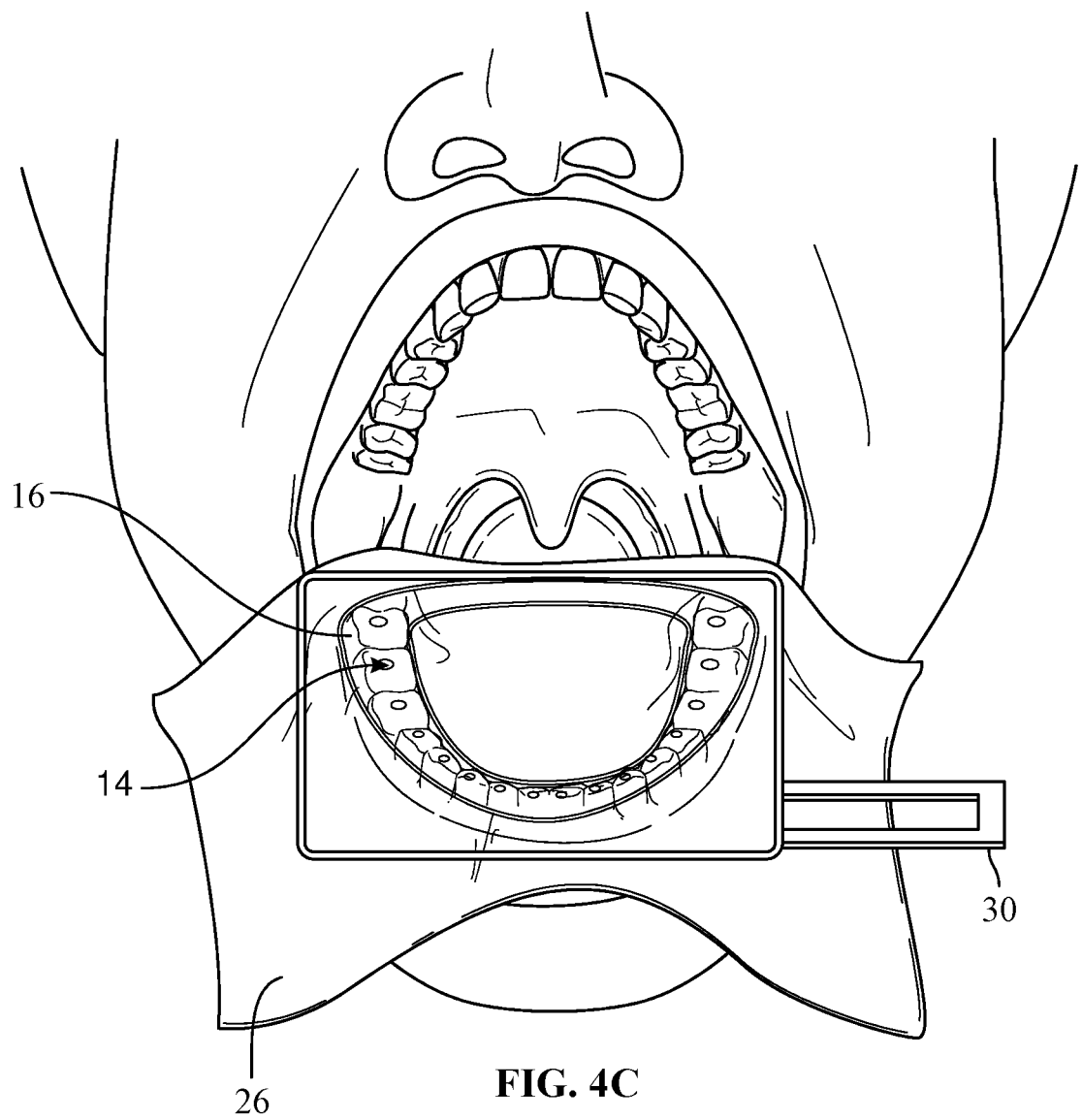
Figure 4D:
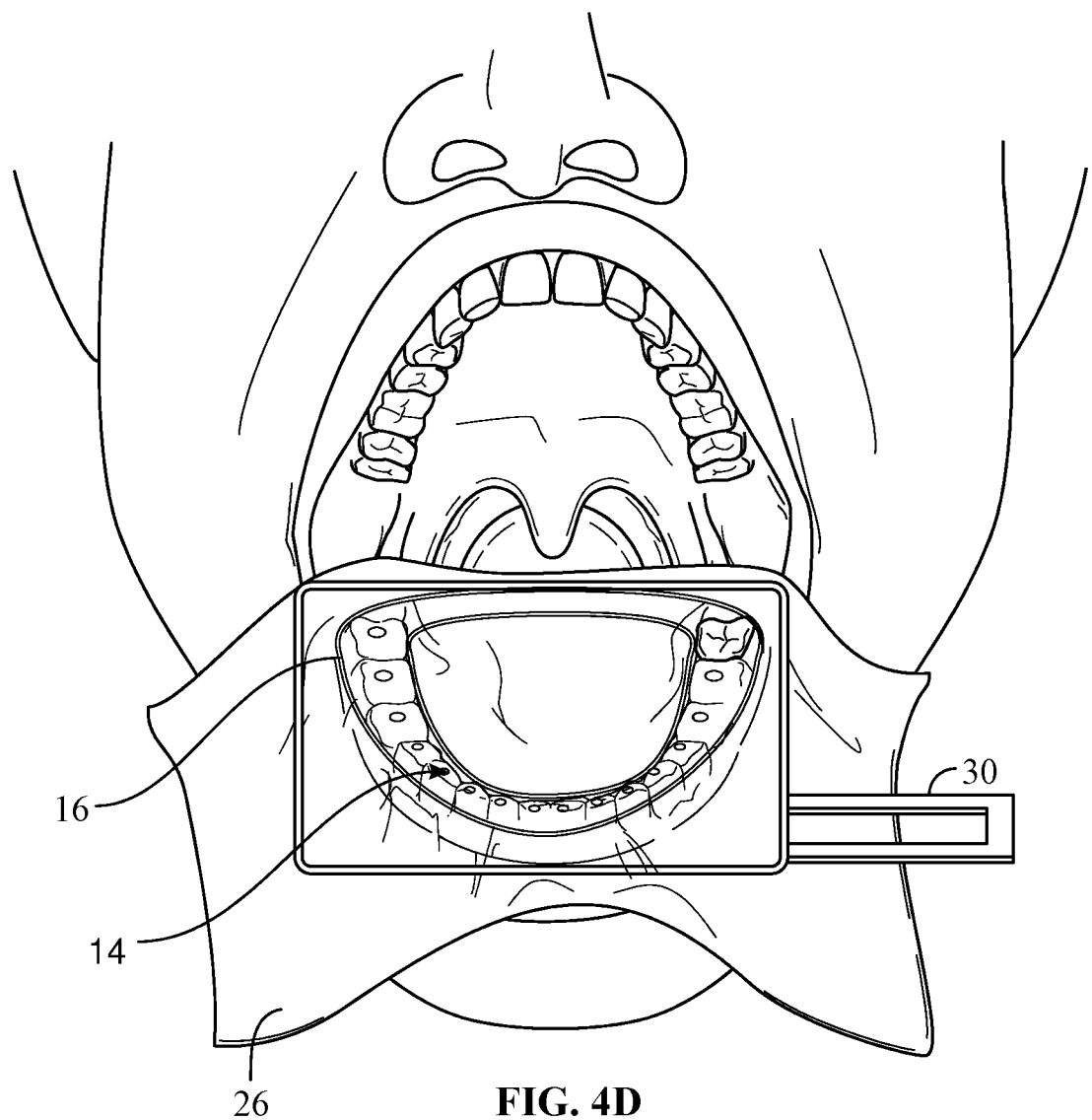
Figure 4E:
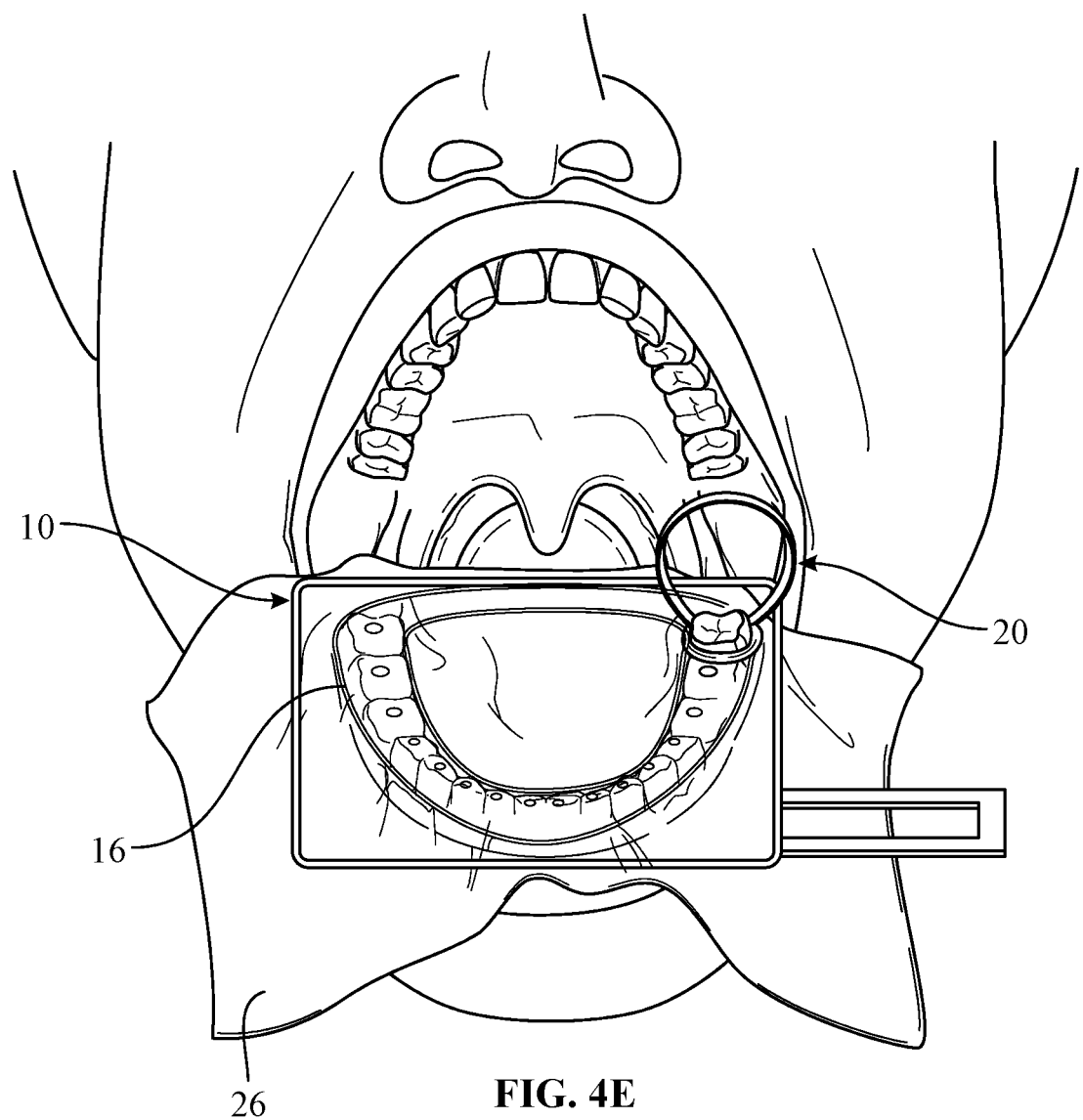
Figure 4F:
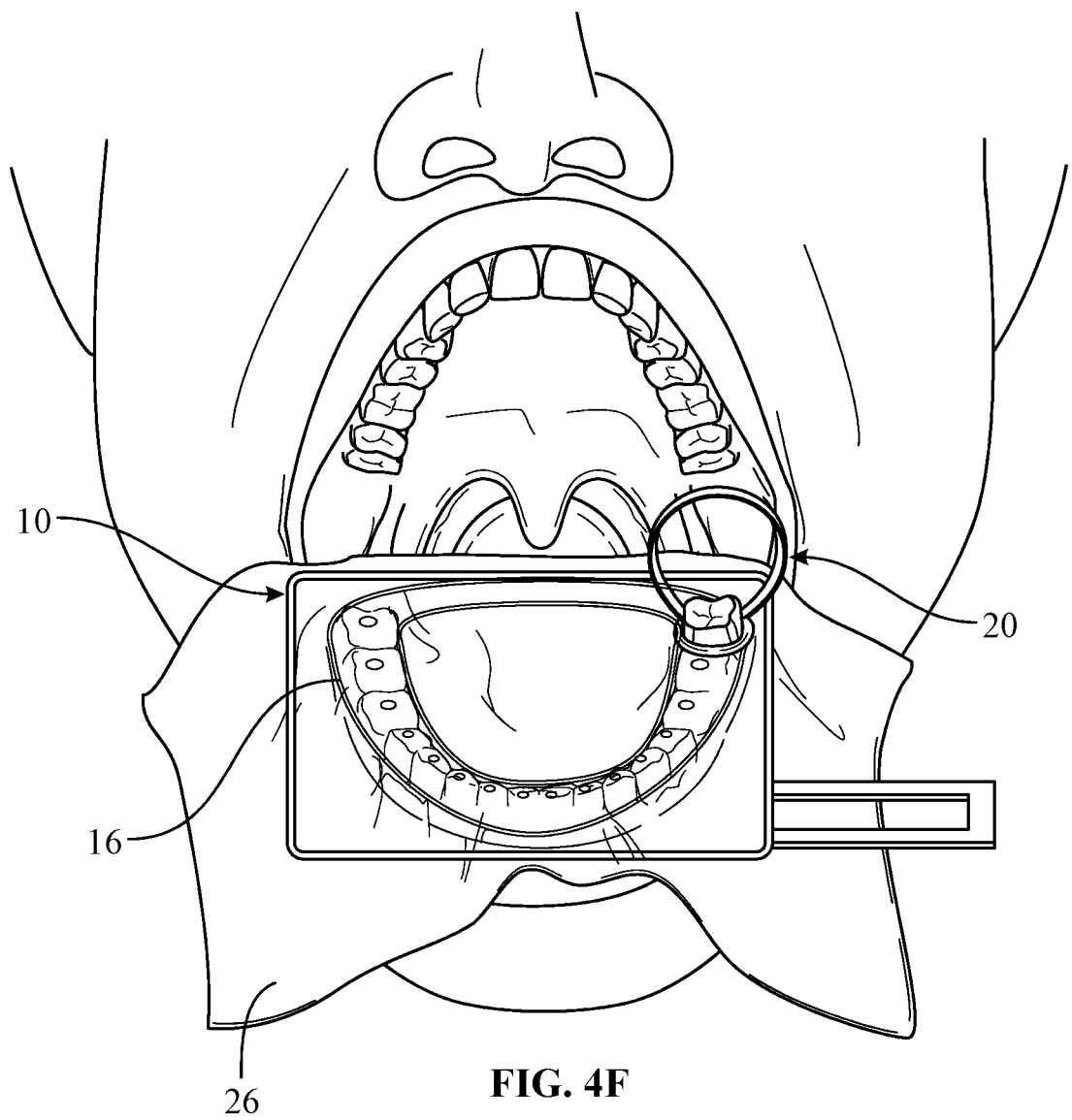

Referring to FIG. 2 and FIG. 3, which show clamp arrangement 20 in accordance with the invention. The clamp, as formed of the shape memory polymer, is created by manipulating a single piece of the polymer into an oral engaging structure.

The clamp 20 includes an undercut section 34, used for slidably engaging the clamp with the formation 16, and for the purpose of creating the oral engaging structure, includes a handle 22 and a pocket region 24.

The handle 22 is shown in the drawings as a bow, but this is not deemed to be limiting. As an example, the purpose of the handle could be served by having a projecting member of polymer which extends away from the pocket region. Any design which allows for a gripping and maneuvering the clamp would suffice.

The pocket region 24 includes at least a first pair of opposing surfaces 40A and 40B. The surfaces are biased toward each other. The surfaces result in a clamping force being exerted against a structure placed therebetween. The force is exerted on what would be the front and the back of an oral structure, more correctly, the force is exerted against the lingual surface and the buccal surface of an oral structure.

To round out the pocket region 24 there is at least a second pair of opposing surfaces 42A and 42B.

The pocket region 24 is designed such that a downward pressure applied to the handle 22, once the pocket region has been aligned over the oral structure of interest, will deform to a degree so as to receive the oral structure within the region. As may be seen in the drawings the region is formed as an opening, surrounded by the opposing surfaces, 40A and 40B, as well as 42A and 42B. The oral structure will thus protrude through the opening in a manner that clear access is made to the structure for further working.

Opposing surfaces 40A and 40B, under the influence of their nature bias, will clamp to the oral structure on the lingual and buccal surfaces. Opposing surfaces 42A and 42B pass between adjacent structures and provide added support and rigidity to the clamp 18.

The undercut section 34 is formed toward a lower end 44 of the clamp 20. The section is engageable with the formation 16. When there exist a pair of formations, as shown in FIG. 1, the clamp will include a pair of undercut sections 34A and 34B to engage with each formation.

The clamp 20 and the formation 16 are engageable in a sliding fashion through engagement of the formation with the undercut section 34. The section allows for controlled sliding movement of the clamp relative to, and along, the surface 26 of the membrane 12. This sliding action will aid the alignment of the clamp.

Turning to FIG. 4, which shows a method of use of the dental dam 10, in accordance with the invention.

First the membrane 12 is placed to a frame 18, in such fashion to create a substantially flat surface of the membrane, thus creating the dental dam 10. Additionally, the surface is taught, such that any deformation along the surface 26 is resisted by the nature of the material and the tensile arrangement attempting to retain the flat shape.

Next, using the arm 30 of the frame 18 to manoeuvre the dam 10, finding the guide formation 16 which runs along the major surface 26 of the membrane 12. Once the formation is located placing the dam over the mouth of the patient such that the formation is facing away from the patient.

Then, positioning the dam 10 so as to align a respective locating portion 14 over an oral structure to be worked on. Once the alignment has taken place, fixing the dam 10 in place by mounting or securing the dam through the arm 30.

Next, depressing the area of the membrane 12 around the respective locating portion 14 about the oral structure of interest. The depressing force being such that the membrane slides down around the oral structure until the structure, or a sufficient portion thereof, projects through the membrane and the portion.

Once this occurs allowing the area of the membrane around the portion to retract about the base of the structure, thus isolating the structure.

Then, finding the guide formation 16 along the surface 26.

Next, engaging the clamp 20 with the guide formation 16. The clamp is preferably engaged by mating the undercut section 34 with the formation. This engagement provides for slidable movement of the clamp along the formation and over the surface.

Then, slidably moving the clamp 20 along the formation 16 until the pocket region 24 is aligned over the oral structure of interest.

Next, applying a force to the handle 22 in the direction of the oral structure, so as to receive said structure within the pocket region 24. The structure thus protruding through the opening created by the pocket region, to be accessible for further work.

Then, allowing opposing surfaces 40A and 40B to exert a compressive force to the lingual and buccal surfaces of the oral structure, while additionally, allowing the opposing surfaces 42A and 42B to pass between adjacent structures and provide added support and rigidity to the clamp 20.

Once the work is complete, and the removal is required, the user may pull the clamp 20 off the oral structure and withdraw the dam 10 from the patients mouth. If removal of either the clamp of the membrane 12 becomes problematic, the user may gently warm each until the material becomes elastic. The dam and clamp will then deform and allow for less restrictive and less painful removal.

The embodiment above provides a scenario in which the locating portions 14 are either holes, or perforated holes. If however, the portions 14 are merely marking on the surface 26 which serve as visual indicators, the user may include a step which involves punching through the membrane 12 at the position, using means well known in the art. The method for use would then continue in the fashion discussed above.

The description above additionally provides for embodiments in which the membrane 12 is black in colour, as opposed to a common green colour which is currently being used in the art.

A person skilled in the art will appreciate that a number of variations may be made to the above described invention or features thereof, without departing from the scope of the present invention.

The invention claimed is:

1. A dental dam comprising:
   a. a substantially planar membrane, having;
      i. a plurality of locating portions on the membrane arranged in an arch representative of an oral structure of a patient; and
      ii. a guide formation along a major surface of the membrane, the guide formation providing a track along the arch on a surface of the membrane; and
   b. a clamp arrangement slidably engaged with the guide formation and movable along the track provided by the guide formation to a desired one of the locating portions;
      wherein the membrane and the clamp arrangement are formed of a shape memory polymer.

2. The dental dam as claimed in claim 1 wherein the clamp arrangement is an elongate piece of the shape memory polymer manipulated to form an oral structure engaging member.

3. The dental dam as claimed in claim 2 wherein the member includes a pocket region, for engaging the oral structure.

4. The dental dam as claimed in claim 3 wherein the pocket region includes at least two opposing surfaces biased toward one another.

5. The dental dam according to claim 1 wherein the clamp includes an undercut section for receiving the formation to provide slidable engagement of the clamp with the formation.

6. The dental dam as claimed in claim 1 wherein each of the locating portions is one of; an aperture through the membrane; a perforated hole through the membrane; a marking on the membrane.

7. The dental dam as claimed in claim 1 wherein the formation is a projection formed in the major surface of the membrane.

8. The dental dam as claimed in claim 1 wherein the formation is a tendon which runs along the major surface of the membrane.

9. The dental dam as claimed in claim 1 which includes a frame toward the perimeter of the membrane, wherein the frame retains a substantially planar shape of the membrane.

10. The dental dam according to claim 1 wherein the shape memory polymer when manipulated into a shape will retain said shape at a first temperature, and will return to a resting shape at a second temperature.

11. The dental dam according to claim 10 wherein the first temperature and the second temperature are not the same temperatures.

12. The dental dam as claimed in claim 1 wherein the membrane is black in color.

\* \* \* \* \*